US012670398B2

(12) United States Patent
Rodriguez Mulet et al.

(10) Patent No.: US 12,670,398 B2
(45) Date of Patent: Jun. 30, 2026

(54) LEARNING APPARATUS AND METHOD

(71) Applicant: KABUSHIKI KAISHA TOSHIBA, Minato-ku (JP)

(72) Inventors: Albert Rodriguez Mulet, Kawasaki Kanagawa (JP); Shuhei Nitta, Tokyo (JP); Yoshiyuki Kokojima, Yokohama Kanagawa (JP); Ryusuke Hirai, Tokyo (JP); Yasutaka Furusho, Fuchu Tokyo (JP); Manabu Nishiyama, Tokyo (JP); Yusuke Natsui, Yokohama Kangawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 682 days.

(21) Appl. No.: 18/173,005

(22) Filed: Feb. 22, 2023

(65) Prior Publication Data

US 2024/0028901 A1 Jan. 25, 2024

(30) Foreign Application Priority Data

Jul. 19, 2022 (JP) ................................. 2022-115048

(51) Int. Cl.
*G06N 3/082* (2023.01)
*G06N 3/048* (2023.01)
(52) U.S. Cl.
CPC ............. *G06N 3/082* (2013.01); *G06N 3/048* (2023.01)
(58) Field of Classification Search
CPC ................................ G06N 3/082; G06N 3/048

USPC .......................................................... 706/25
See application file for complete search history.

(56) References Cited

U.S. PATENT DOCUMENTS

| | | | |
|---|---|---|---|
| 11,436,490 B2 | 9/2022 | Tanizawa et al. | |
| 2018/0330235 A1* | 11/2018 | Lin ........................ | G06N 3/063 |
| 2018/0365557 A1 | 12/2018 | Kobayashi | |
| 2020/0012945 A1 | 1/2020 | Yaguchi et al. | |
| 2022/0083856 A1 | 3/2022 | Yaguchi et al. | |
| 2024/0028902 A1 | 1/2024 | Rodriguez Mulet et al. | |
| 2024/0195433 A1* | 6/2024 | Aksu ....................... | H03M 7/30 |

FOREIGN PATENT DOCUMENTS

| | | |
|---|---|---|
| JP | 2021039460 A | 3/2021 |
| JP | 2021043772 A | 3/2021 |
| JP | 6951295 B2 | 9/2021 |

(Continued)

OTHER PUBLICATIONS

Qian, et al., "Adaptive activation functions in convolutional neural networks", Neurocomputing 272 (2008) 204-212, 2008 (Year: 2008).*

(Continued)

*Primary Examiner* — Tsu-Chang Lee
(74) *Attorney, Agent, or Firm* — Holtz, Holtz & Volek PC

(57) ABSTRACT

According to one embodiment, a learning apparatus includes a processor. The processor performs, on a neural network model, an adaptation processing that includes at least either insertion of an activation function, or correction of the activation function. The processor generates a trained model by training the neural network model on which the adaptation processing has been performed. The processor performs pruning on the trained model to generate a reconstructed model from which a parameter has been reduced.

14 Claims, 6 Drawing Sheets

(56) References Cited

FOREIGN PATENT DOCUMENTS

| | | | |
|---|---|---|---|
| JP | 2022049271 | A | 3/2022 |
| JP | 2022054660 | A | 4/2022 |
| JP | 2024013057 | A | 1/2024 |
| WO | 2017154284 | A1 | 9/2017 |

OTHER PUBLICATIONS

Lau et al., "Review of adaptive activation function in deep neural network", 2018 IEEE-EMBS conference on biomedical engineering and science (IECBES), 2018 (Year: 218).*

Sharma, et al., "Activation functions in neural networks", International journal of engineering applied sciences and technology, 2020 (Year: 2020).*

Vaswani, et al., "Attention Is All You Need", Neural Information Processing Systems (NIPS), 2017, https://arxiv.org/abs/1706.03762.

Japanese Office Action (and an English language translation thereof) dated Nov. 4, 2025, issued in counterpart Japanese Application No. 2022-115048.

* cited by examiner

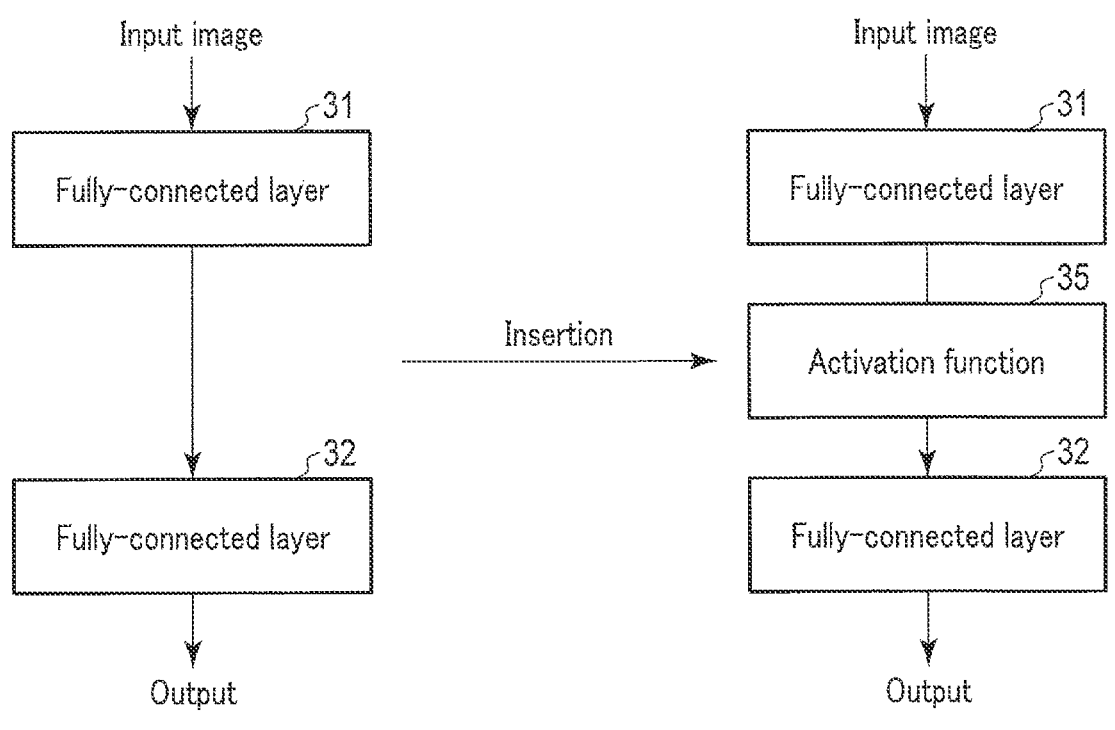
F I G. 3
F I G. 4

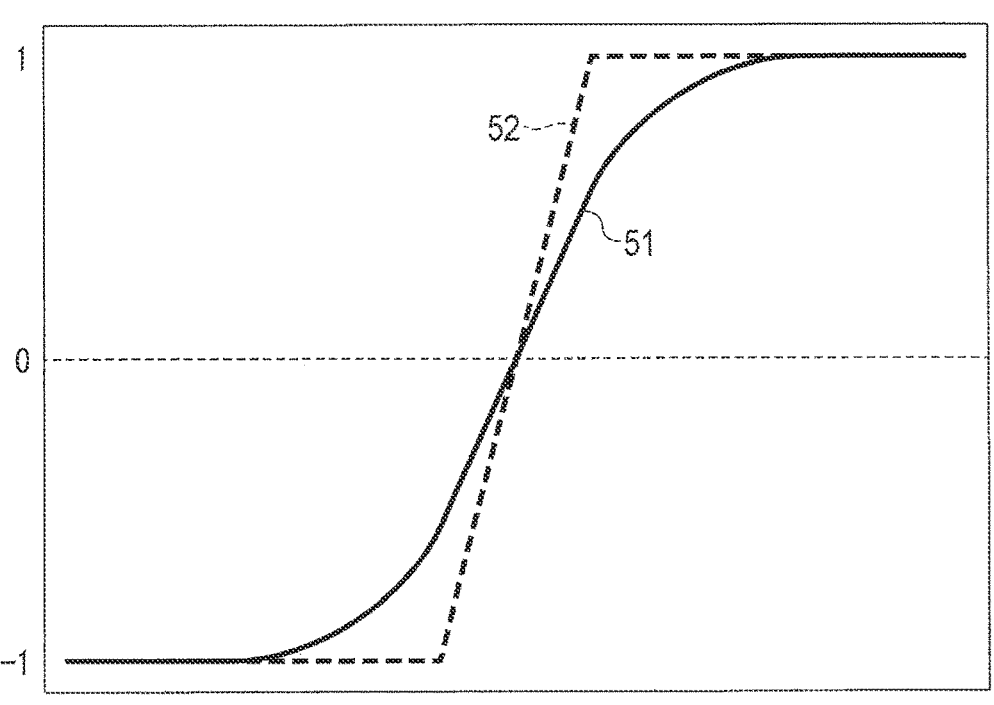
F I G. 5
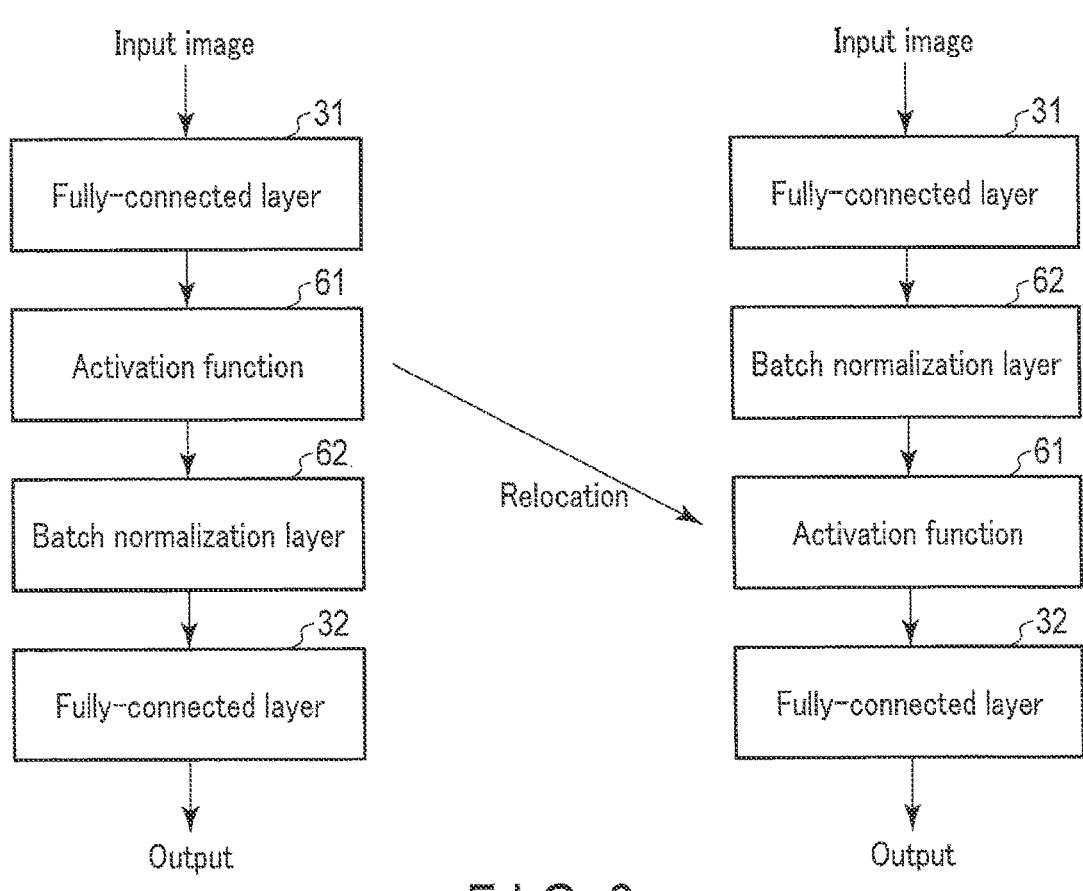
F I G. 6

LEARNING APPARATUS AND METHOD

CROSS-REFERENCE TO RELATED APPLICATIONS

This application is based upon and claims the benefit of priority from Japanese Patent Application No. 2022-115048, filed Jul. 19, 2022, the entire contents of which are incorporated herein by reference.

FIELD

Embodiments described herein relate generally to a learning apparatus and a method.

BACKGROUND

Pruning has been known as a method for reducing a model size of a neural network. Pruning can reduce the model size of the neural network while maintaining inference accuracy, by reducing parameters (weighting factors or channels) of the neural network. More specifically, the parameter (weighting factor and channel) of a hidden layer is pruned typically by using an activation function such as rectified linear unit (ReLU) or hyperbolic tangent.

A hidden layer having no activation function, however, cannot be pruned efficiently, thus posing a problem that a desired effect of pruning is not obtainable.

BRIEF DESCRIPTION OF THE DRAWINGS

FIG. 3 is a diagram illustrating a first example of adaptation processing according to the present embodiment.

FIG. 4 is a diagram illustrating a second example of the adaptation processing according to the present embodiment.

FIG. 5 is a graph illustrating difference in shape of activation functions.

FIG. 6 is a diagram illustrating a third example of the adaptation processing according to the present embodiment.

DETAILED DESCRIPTION

Figure 1:
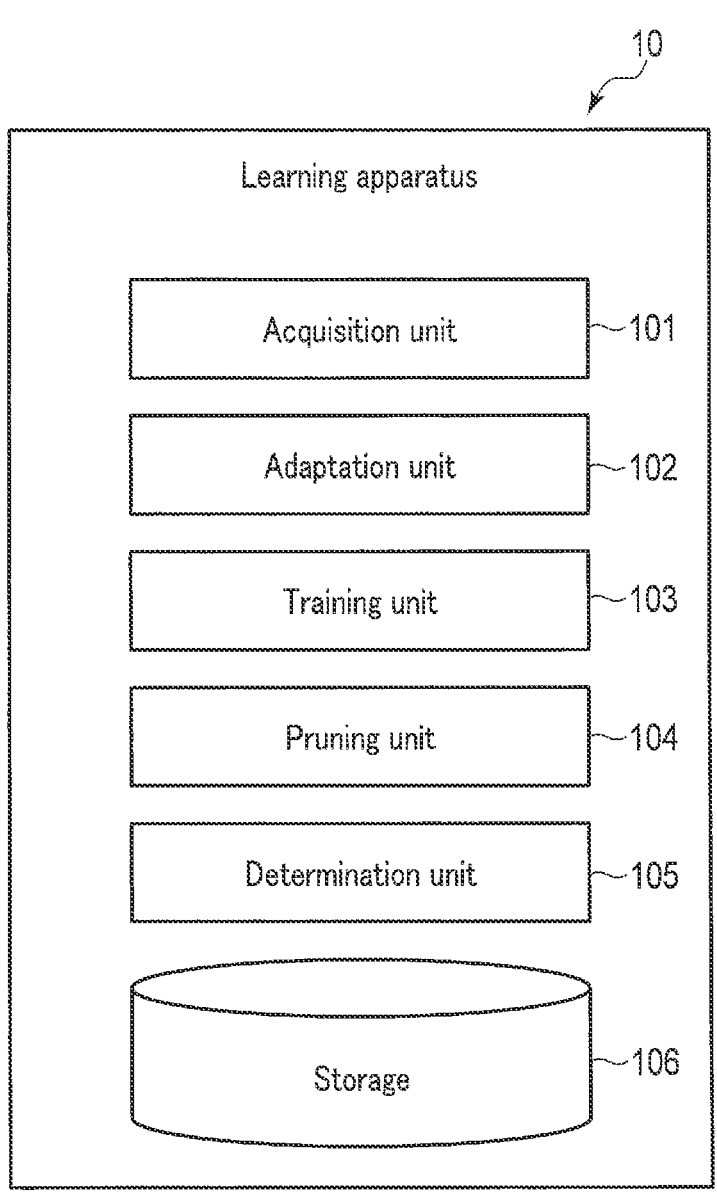
FIG. 1 is a block diagram illustrating a learning apparatus according to the present embodiment.

In general, according to one embodiment, a learning apparatus includes a processor. The processor performs, on a neural network model, an adaptation processing that includes at least either insertion of an activation function, or correction of the activation function. The processor generates a trained model by training the neural network model on which the adaptation processing has been performed. The processor performs pruning on the trained model to generate a reconstructed model from which a parameter has been reduced.

A learning apparatus, a method, and a program product according to the present embodiment will be detailed below, with reference to the attached drawings. Note, in the following embodiment, any parts denoted by the same reference numerals are understood to operate similarly, for the convenience of skipping duplicate explanation.

A learning apparatus according to the present embodiment will be explained with reference to a block diagram of FIG. 1.

A learning apparatus 10 according to the present embodiment has an acquisition unit 101, an adaptation unit 102, a training unit 103, a pruning unit 104, a determination unit 105, and a storage 106.

The acquisition unit 101 acquires training data and a neural network model. A neural network is not limited to a plurality of fully-connected layers such as the multilayer perceptron (MLP), and may alternatively be any of networks whose architecture is a convolutional neural network (CNN) such as VGG16, ResNet, or DenseNet; recurrent neural network; transformer; and graph neural network.

The adaptation unit 102 performs adaptation processing that includes at least either insertion of an activation function into the neural network model, or correction of an activation function. The adaptation processing according to the present embodiment specifically refers to a process for arranging an activation function suitable for pruning into the neural network model, such as inserting the activation function between layers of the neural network model, replacing the activation function with another activation function, and relocating the activation function to another point.

The training unit 103 trains the neural network model on which the adaptation processing has been performed, and generates a trained model.

The pruning unit 104 performs pruning on the trained model, and generates a reconstructed model from which a parameter has been reduced.

The determination unit 105 determines whether or not the re-adaptation processing is necessary for the reconstructed model, and whether or not re-training of the reconstructed model is necessary.

The storage 106 typically stores training data, the neural network model, and the reconstructed model.

Figure 2:
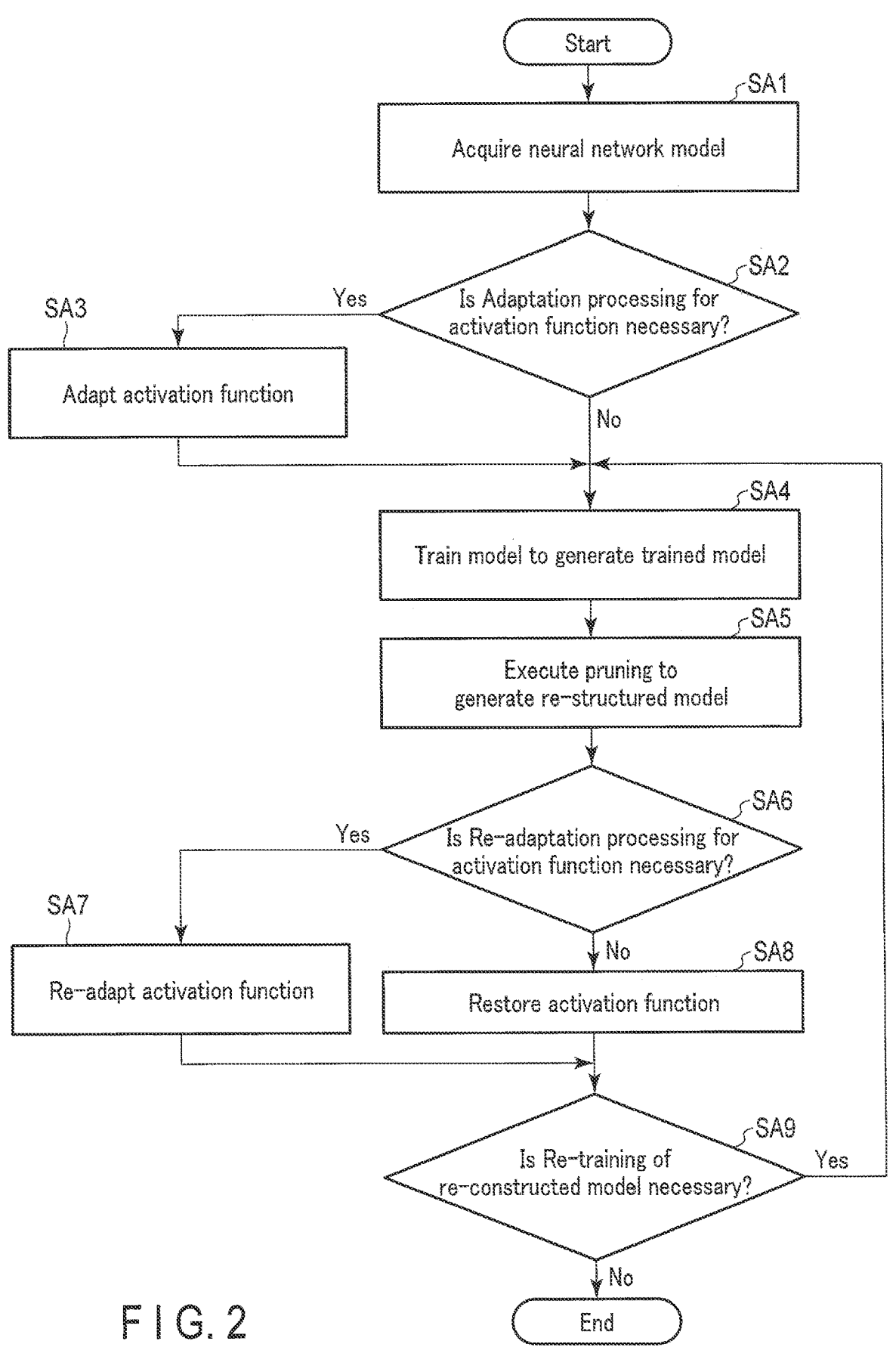
FIG. 2 is a flowchart illustrating exemplary operation of the learning apparatus according to the present embodiment.

Next, exemplary operation of the learning apparatus 10 according to the present embodiment will be explained with reference to a flow chart of FIG. 2.

Note, the present embodiment will explain exemplary training of a neural network model that executes a two-class image classification task for classifying an image, used as training data, into dog or cat. The training data is not limited to an image, but may be video, text, audio, or time-series data such as sensing data. In addition, a target task to be inferred by the neural network model is not limited to the classification task, instead allowing other target tasks such as object detection, semantic segmentation, regression, and prediction to be applied similarly.

In step SA1, the acquisition unit 101 acquires training data and the neural network model from the storage 106.

In step SA2, the determination unit 105 determines whether or not the adaptation processing of the activation function is necessary for the neural network model. Here, the determination is made on the basis of whether or not channel-wise pruning according to group sparsification with inactive channels and inactive nodes, as described in a prior art document (US 2020/0012945 A1) can be performed. That is, the nodes and the channels in all hidden layers of the neural network model will have set thereon an activation function having a range of input value with which a differential function will become zero, or will asymptotically approach zero. For example, the activation function is a function whose differential function will become larger than zero in a range of input value on the plus side of a predetermined input value, and will be zero or asymptotically approach zero in a range of input value on the minus side of the predetermined input value, which is exemplified by rectified linear unit (ReLU). Setting of such activation function makes the inactive node and the inactive channel more likely to appear. Furthermore, the neural network model, when optimized with use of L2 regularization for regularization, and an Adam or Adam-like optimizer as an optimizer, will become more likely to cause group sparsification, thus typically making it possible to perform channel-wise pruning.

Whether or not the adaptation processing is necessary is thus determined, on the basis whether or not the optimization condition of the aforementioned prior art document is satisfied. For example, the adaptation processing is judged to be necessary if there is no activation function between certain layers, since insertion of the activation function possibly proceeds the pruning. Meanwhile, if there is the activation function in the neural network model, the activation function may only be corrected so as to reduce the gradient of parameter relative to loss during the training.

If the adaptation processing of the activation function is necessary, the process proceeds to step SA3, whereas if the adaptation processing of the activation function is unnecessary, the process proceeds to step SA4.

In step SA3, the adaptation unit 102 performs the adaptation processing of the activation function. The present embodiment assumes the aforementioned insertion, replacement, and relocation of the activation function, as the adaptation processing. The adaptation unit 102 may apply any one of the adaptation processing to the neural network model, or may apply plural types of processing. For example, the adaptation unit 102 may combine the processing for replacing the activation function contained in the neural network model, with the processing for relocating it to another point.

Alternatively, the adaptation processing may apply plural types of technique, and the neural network models thus differently processed for adaptation may be subjected to the training in the next step SA4. For example, the adaptation unit 102 may execute two patterns of processing for the point free of the activation function, one for inserting ReLU as the activation function, and the other for inserting a hard sigmoid function as a different activation function, and the neural network models in the individual patterns may be subjected to the training in the next step SA4.

In step SA4, the training unit 103 trains the neural network model having been subjected to the adaptation processing in step SA3, or the neural network model having been determined in step SA2 to be in no need of adaptation processing, with use of the training data, to generate a trained model.

The training of the neural network model may typically rely upon "supervised learning", with use of training data that contain ground truth. More specifically, assuming now an input image $x^{\rightarrow}_i$ ($i=1, \ldots, N$). N is a natural number of 2 or larger. The superscript arrow indicates a vector set. Note that i represents a serial number of the training data, or, the number of training data. The input image $x^{\rightarrow}_i$ is now given as a pixel set with horizontal width W and with vertical width T, that is, a (W×T)-dimensional vector.

Meanwhile, a target label $t^{\rightarrow}_i$ is a two-dimensional vector, having 1 for an element that corresponds to the target label, and 0 for the other element. More specifically, the input image $x^{\rightarrow}_i$ may be denoted, for example, by $(1,0)^T$ for dog, and by $(0,1)^T$ for cat. Now, $(\ )^T$ represents a column vector.

In the training of the neural network model, the output $y^{\rightarrow}_i$ of the neural network model, in response to the input image $x^{\rightarrow}_i$, may be given by formula (1). Now, the output $y^{\rightarrow}_i$ represents an estimated probability value.

$$y^{\rightarrow}_i = f(\Theta^{\rightarrow}, x^{\rightarrow}_i) \tag{1}$$

Now, function $f(\Theta^{\rightarrow},)$ is a function of a neural network model that holds a parameter set $\Theta^{\rightarrow}$, and outputs a two-dimensional vector.

The training error $L_i$ will be assumed to use an equation given by formula (2). Now, ln represents a natural logarithm.

$$L_i = -t^{\rightarrow T}_i \ln(y^{\rightarrow}_i) \tag{2}$$

The calculation makes use of cross entropy between the target label $t^{\rightarrow}_i$ and the output $y^{\rightarrow}_i$ of the neural network model. In the present embodiment, the parameter set $\Theta^{\rightarrow}$ of the neural network model is iteratively trained by mini-batch training, according to the back propagation method and the stochastic gradient descent method, so as to minimize a loss function L which is based on the weighted average of the training error $L_i$.

In the present embodiment, the training unit 103 trains the neural network model under training conditions typically by setting "Adam" for the optimizer, "0.001" for the L2 regularization intensity λ, "100" for the number of epochs, and "64" for the mini-batch size. Of course, training may rely upon other training conditions such as different learning rate or different regularization strength, or may be performed under a plurality of training conditions, from which the one yielding better performance is adoptable.

An end condition of the iterative training may only be determined typically on the basis whether or not a determination index, such as training error $L_i$, or an absolute value or a decrement of output of the loss function L, is equal to or smaller than a threshold value. If the determination index is equal to or smaller than the threshold value, the training unit 103 may only determine that the end condition of the iterative training is satisfied. Alternatively, the training unit 103 may determine whether or not the number of iterations has reached a predetermined number of times, and may determine that the end condition of the iterative training is satisfied, if the number of iterations has reached the predetermined number of times. Upon end of the iterative training, the training of the neural network model comes to the end, and the trained model is generated.

The training of the neural network may rely upon any method, without being limited by the aforementioned example. The training error $L_i$ may alternatively be calculated by using binary cross entropy. Although the aforementioned binary classification of dog or cat assumed that the output layer contains the sigmoid function, a multi-class classification task intended for classification into three or more classes may employ a softmax function in the output layer.

In step SA5, the pruning unit 104 executes pruning on the trained model. The pruning is typically performed by calculating an L2 norm of a weighting factor for the individual channels in the hidden layer, selecting only channels whose L2 norms are larger than a predetermined threshold value ($10^{-6}$, for example) (referred to as residual channels), and generating a reconstructed model which is a neural network model composed of such residual channels. Alternatively, the reconstructed model may be generated by selecting only the channels whose absolute values of the weighting factor in the hidden layer are equal to or larger than a predetermined threshold value. That is, channels in which absolute values of all of the weighting factors set therein are almost zeroed, that is, the group sparse channels may be deleted, by the technique described in the aforementioned prior art document.

In step SA6, the determination unit 105 determines whether or not another adaptation processing of the activation function (re-adaptation processing) is necessary for the reconstructed model. Whether or not the re-adaptation processing is necessary may be determined typically by comparing the performance of the reconstructed model with the baseline performance. The re-adaptation processing is judged to be unnecessary, if the performance of the reconstructed model is equivalent or superior to the baseline performance, meanwhile the re-adaptation processing is judged to be necessary if the performance of the reconstructed model is lower than the baseline performance.

The baseline performance is an index related to the performance of a trained model obtained after trained under training condition different from the training condition in the aforementioned step SA4, and is used as a baseline for determining whether or not the performance of the reconstructed model obtained by pruning is excellent. The baseline performance may employ an index value which is usually assumed according to the task, or, the training unit 103 may create the baseline performance. In a case of using the usually assumed index value, for example, the binary classification task may employ the index values such as precision, recall, and F1 value. On the other hand, in a case of creation by the training unit 103, the training condition for generating the baseline performance may employ a result of training of the neural network model, with use of "stochastic gradient descent (SGD)" for the optimizer, and "0" for the L2 regularization strength. The determination unit 105 may only compare the created baseline performance with the performance of the reconstructed model, to determine whether or not the re-adaptation processing is necessary.

Even if the performance of the reconstructed model is lower than the baseline result, the re-adaptation processing may be judged to be unnecessary, if the required specifications of the finally output model are satisfied. More specifically, the re-adaptation processing may be judged to be unnecessary, if a required specification such as "in a case where the reconstructed model could perform the pruning process on β% of all of the parameters, while maintaining α % or larger matching rate" is satisfied.

If the re-adaptation processing was judged to be necessary, the process proceeds to step SA7, and the similar process is iterated. If the re-adaptation processing was judged to be unnecessary, the process proceeds to step SA8.

In step SA7, the adaptation unit 102 executes the re-adaptation processing of the activation function of the reconstructed model. The re-adaptation processing is similar to step SA3 except that the object to be adapted is the reconstructed model, so that explanation therefor will be skipped. The re-adaptation processing performed here may be different from the previous adaptation processing. For an exemplary case where the previous adaptation processing was such as inserting the activation function ReLU, then the re-adaptation processing may be such as replacing ReLU with GeLU. In an alternative case where the previous adaptation processing was such as replacing the activation function ReLU with the hard sigmoid function, then the re-adaptation processing may be such as replacing the hard sigmoid function with the sigmoid function.

In step SA8, the adaptation unit 102 restores the adaptation processing executed in step SA3, to the state before the adaptation. In an exemplary case where the activation function has been inserted into the reconstructed model by the adaptation processing in step SA3, the adaptation unit 102 executes a process for deleting the activation function. In a case where the activation function has been replaced with another activation function, the adaptation unit 102 executes a process for restoring the previous activation function. In a case where the point of connection of the activation function has been changed, the adaptation unit 102 executes a process for returning the activation function back to the previous point of connection.

In step SA9, the determination unit 105 determines whether or not re-training is necessary for the reconstructed model. Whether or not the re-training is necessary may be determined typically by comparing the performance of the re-adapted reconstructed model with the baseline performance. The re-training is judged to be unnecessary, if the performance of the re-adapted reconstructed model is equivalent or superior to the baseline performance.

If the re-training is necessary, the process goes back to step SA4, and the similar processing is iterated. If the re-training is unnecessary, which means completion of the pruning of the trained model, a final reconstructed model is generated, and the reconstructed model is stored in the storage 106. Alternatively, the final reconstructed model may be output typically to a destination of deployment. In the re-training, the parameter to be initialized for training may be the parameter obtained in the previous training, rather than randomly initialized parameter. That is, the re-training may be executed by fine tuning. In the re-adaptation processing in step SA7, the parameter of the hidden layer may be initialized by multiplying it by an appropriate constant (gain), if the type of the activation function after the re-adaptation processing is different from that of the activation function in the previous adaptation processing.

Note that the restoration of the activation function in step SA8 is not essential, so that the pruning of the reconstructed model may be continued, while keeping the activation function to which the adaptation processing still applies. In an exemplary case where the activation function has been inserted into the neural network model by the adaptation processing for training, the pruning processing may be continued while maintaining the inserted activation function, if the determination unit 105 determines that the reconstructed model will have the performance equivalent or superior to that of the model before insertion of the activation function. Whether or not to restore the activation function adapted by the adaptation processing may only be determined by a method similar to the determination of the re-adaptation processing with use of the baseline performance.

In an exemplary case where the activation function has been replaced by the adaptation processing, which is typically in a case where the hyperbolic tangent function used as the activation function has been replaced with the hard hyperbolic tangent function, the calculation cost can be reduced since the hard hyperbolic tangent function has a linear section. Hence, in a case where the calculation cost of the destination of deployment may be reduced when deploying the finally generated reconstructed model, the pruning process may be continued while maintaining the activation function after the replacement. In a further case where the neural network was found to acquire more generalized performance as a result of change of the point of insertion of the activation function, such point of insertion of the activation function may be maintained.

Next, a first example of the adaptation processing according to the present embodiment will be explained with reference to FIG. 3.

The left drawing in FIG. 3 illustrates a neural network having a fully connected layer 31 and a fully connected layer 32 connected therein, to which a hidden layer free of the activation function is coupled. This neural network is less easy to reduce the parameter during the pruning, since a node that connects the parameter of the fully connected layer 31 and the parameter of the fully connected layer 32 is not convertible by a nonlinear function.

Hence, the activation function is connected next to a hidden layer to be pruned, from among the hidden layers that form the neural network model. More specifically, an activation function 35 is inserted between the fully connected layer 31 and the fully connected layer 32, as illustrated in the right drawing of FIG. 3. The activation function 35 typically uses ReLU. Hence, upon input of an output from the fully connected layer 31 into the activation function 35, there appear the nodes and channels which are not activated by the activation function. The pruning of the fully connected layer 31 may thus be executed.

Note in a case of inserting the activation function 35, the adaptation unit 102 may determine the point of insertion of the activation function 35, so that the feature map obtainable from the hidden layer before insertion of the activation function 35 will not vary.

Next, a second example of the adaptation processing according to the present embodiment will be explained with reference to FIGS. 4 and 5.

The left drawing in FIG. 4 illustrates a neural network that contains an activation function, in which a fully connected layer 31, a first activation function 41, and a fully connected layer 32 are connected. Now, the first activation function 41 is assumed to be the hyperbolic tangent.

In contrast in the right diagram of FIG. 4, the first activation function 41 is replaced with a second activation function 45 that behaves similarly, but gives a smaller gradient of the magnitude of parameter relative to the loss. Now, the hard hyperbolic tangent function is assumed as the second activation function 45.

In relation to an exemplary replacement from the first activation function 41 to the second activation function 45, FIG. 5 illustrates comparison between the hyperbolic tangent function and the hard hyperbolic tangent function. FIG. 5 is a graph illustrating input value (abscissa) versus output value (ordinate) of hyperbolic tangent function 51 and the hard hyperbolic tangent function 52.

As compared with the hyperbolic tangent function 51, the hard hyperbolic tangent function 52 has a wider range over which "1" or "−1" is output, that is, has a larger zone where the function appears flat. Hence, as compared with the hyperbolic tangent function 51, the hard hyperbolic tangent function 52 will give reduced gradient of the parameter, thus making it possible to prune a larger number of parameters. Also since the hard hyperbolic tangent function 52 is calculable with a linear function, so that the calculation cost, such as computational complexity, may be reduced.

A candidate for replacement from the first activation function 41 to the second activation function 45 may also be determined with reference to a lookup table. For example, a lookup table in which an activation function having a smooth function shape is correlated with an activation function having a linear function shape called hard version, may be prepared. The adaptation unit 102 can replace the current first activation function 41 with the second activation function 45 which is suitable for pruning, by referring to the lookup table.

In a case where the first activation function 41 is replaced with the second activation function 45, the adaptation unit 102 may also calculate an error between the first activation function 41 and a candidate for the activation function that will possibly be the second activation function 45, and may determine an activation function that gives the minimum error as the second activation function. This makes it possible to continue the training, without significantly changing the output from the first activation function of the initial neural network model.

Next, a third example of the adaptation processing according to the present embodiment will be explained with reference to FIG. 6.

The left drawing in FIG. 6 illustrates a neural network that contains an activation function, in which a fully connected layer 31, an activation function 61, a batch normalization layer 62, and a fully connected layer 32 are connected. The adaptation unit 102 relocates the activation function so as to be connected to a point different from the current point of connection. That is, as shown in the right drawing in FIG. 6, the point of connection of the activation function 61 is relocated next to the batch normalization layer 62.

Hence, the activation function 61 will have, as an input, the output of the batch normalization layer 62, and this stabilizes distribution of the input to the activation function 61, and makes it possible to prune a larger number of parameters.

Next, a fourth example of the adaptation processing according to the present embodiment will be explained with reference to FIG. 7.

Figure 7:
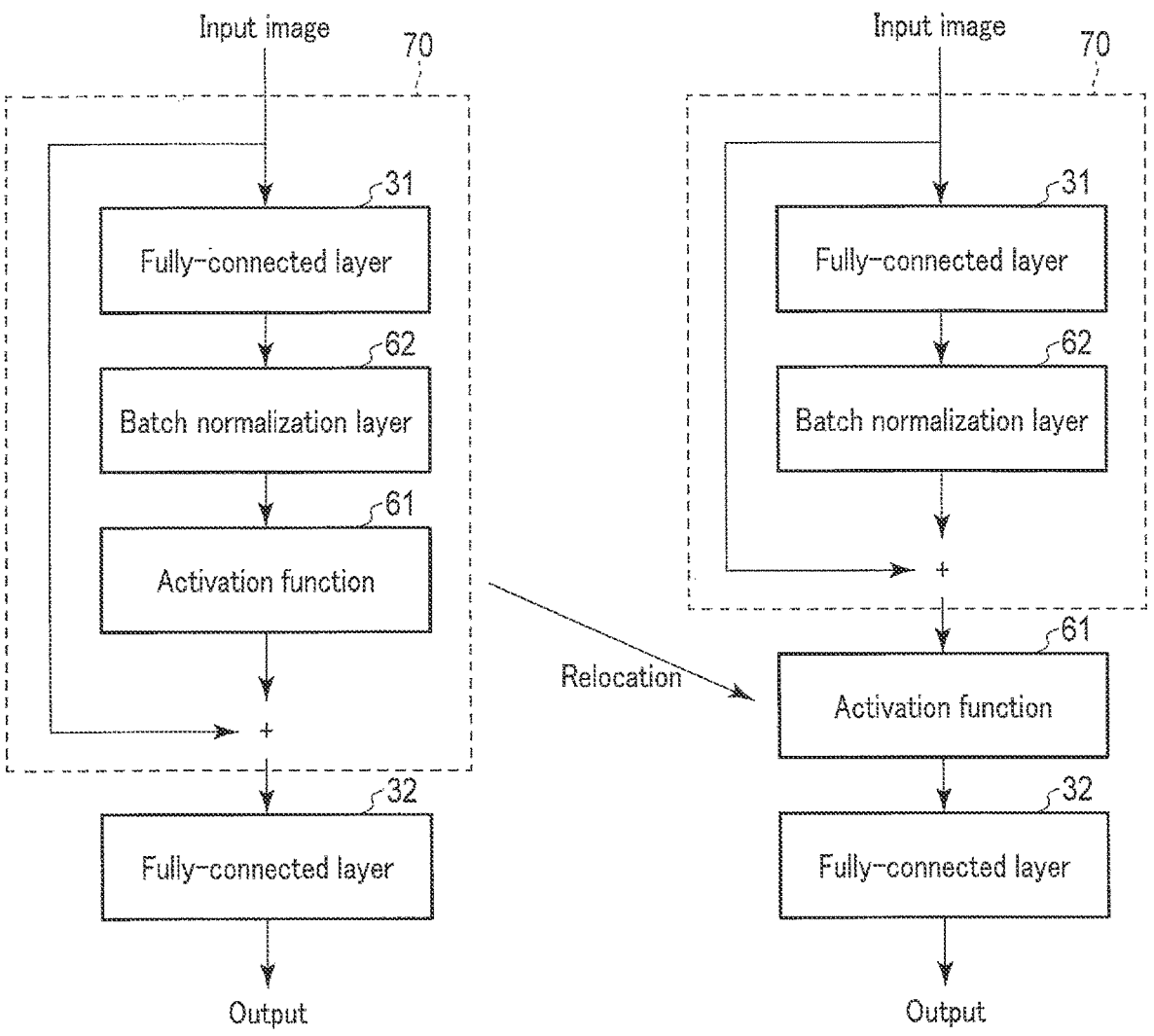
FIG. 7 is a diagram illustrating a fourth example of the adaptation processing according to the present embodiment.

The left drawing in FIG. 7 illustrates a neural network that contains an activation function, in which a fully connected layer 31, a batch normalization layer 62, an activation function 61, and a fully connected layer 32 are connected. More specifically, the left drawing in FIG. 7 assumes a residual block 70 having a connection flow that contains the fully connected layer 31, the batch normalization layer 62, and the activation function 61, to which an input image is skip-connected, thus structured to sum up the output of the residual block 70 and the input image, to give an input to the fully connected layer 32.

Also for this type of residual block 70, the adaptation unit 102 relocates and sets the activation function 61 next to the residual block 70. This makes the channels available for the pruning of a plurality of residual blocks 70, making it possible to prune a larger number of parameters.

In a case of relocating the activation function 61 as illustrated in FIGS. 6 and 7, the adaptation unit 102 may determine a destination of relocation of the activation function 61, so as not to vary a feature map obtainable from a hidden layer before the relocation of the activation function 61.

Note that, for a classification task, the adaptation unit 102 does not necessarily insert or relocate the activation function next to the layer just before the output layer of the neural network model (reconstructed model), since an influence on the inference will be large.

According to the present embodiment, the reconstructed model is generated by performing, on the neural network model, the adaptation processing such as insertion, replacement, or relocation of the activation function, followed by training and pruning. The embodiment also judges whether or not the adaptation is necessary for the reconstructed model, performs the re-adaptation processing, similarly judges whether the re-training is necessary or not, and iteratively performs the re-adaptation processing and the re-training processing until a predetermined condition is satisfied. Hence, it now becomes possible to prune the weighting factor and the channel of the layer, which could not be pruned before the adaptation processing of the activation function, thus enabling effective pruning.

Figure 8:
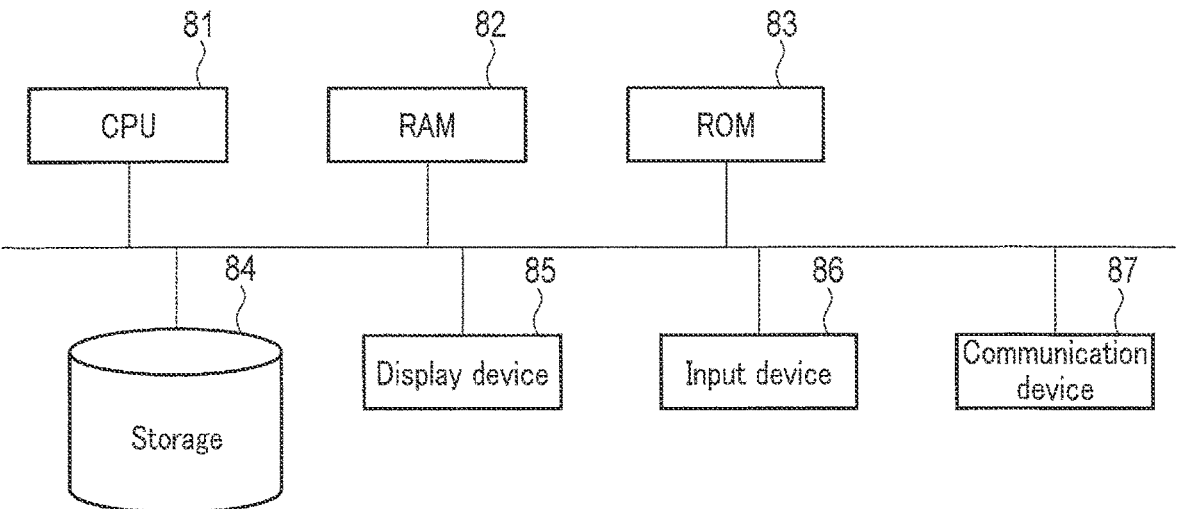
FIG. 8 is a block diagram illustrating an exemplary hardware configuration of a learning apparatus 10 according to the embodiment.

Next, an exemplary hardware configuration of a learning apparatus 10 according to the embodiment is illustrated in a block diagram of FIG. 8.

The learning apparatus 10 has a central processing unit (CPU) 81, a random access memory (RAM) 82, a read only memory (ROM) 83, a storage 84, a display device 85, an input device 86, and a communication device 87, which are mutually connected via a bus.

The CPU 81 is a processor that typically executes arithmetic processing or control processing, according to a program product. The CPU 81 uses a predetermined area of the RAM 82 as a work area, and executes processing of various sections of the learning apparatus 10, in cooperation with a program product stored typically in the ROM 83 or the storage 84.

The RAM 82 is a memory such as a synchronous dynamic random access memory (SDRAM). The RAM 82 functions as a work area of the CPU 81. The ROM 83 is a memory that stores the program product and various types of information in a non-rewritable manner.

The storage 84 is a device that writes and reads data typically to and from a magnetic recording medium such as hard disk drive (HDD), a semiconductor storage medium such as flash memory, a magnetically recordable storage medium such as HDD, or optically recordable storage medium. The storage 84 writes and reads data to and from the storage medium, under the control of the CPU 81. The storage 84 implements a storage 106 of the aforementioned learning apparatus 10.

The display device 85 is a display device such as liquid crystal display (LCD). The display device 85 displays various types of information in response to display signals from the CPU 81.

The input device 86 is an input device such as a mouse and a keyboard. The input device 86 accepts information entered by user's operation as an instruction signal, and outputs the instruction signal to the CPU 81.

The communication device 87 communicates with an external device via a network, under control by the CPU 81.

The commands illustrated in the processing procedures illustrated in the aforementioned embodiments may be executed, according to a program product which is software. An effect similar to that ascribed to the control operation of the aforementioned learning apparatus is obtainable, with use of a general-purpose computer that preliminarily stores the program product, and reads the program product. The commands described in the aforementioned embodiments are recorded in the form of program product that can be run on a computer, in a magnetic disk (flexible disk, hard disk, etc.), an optical disk (CD-ROM, CD-R, CD-RW, DVD-ROM, DVD±R, DVD±RW, Blu-ray (registered trademark) Disc, etc.), semiconductor memory, or any analogous recording media. The recording medium may have any format of storage, as long as it is readable by a computer or an embedded system. The computer can perform control similar to that attributable to the learning apparatus of the aforementioned embodiments, by reading the program product from the recording medium, and makes the CPU execute the commands described in the program product, according to the program product. Of course, acquisition or reading of the program product by the computer may be acquisition or reading via a network.

Alternatively, an operating system (OS) that runs on the computer, while being instructed by a program product installed on the computer or on the embedded system from the recording medium, or middleware (MW) such as database management system or network, may execute a part of the individual processes that constitute the present embodiment.

Furthermore, the recording medium in the present embodiment is not limited to a medium independent of the computer or the embedded system, and includes a recording medium that stores or temporarily stores the program product transmitted typically via LAN or the Internet, and downloaded therefrom.

The recording medium in the present embodiment is not limited to a single medium, but may be a plurality of media from which the processing of the present embodiment is executed. The medium may have any type of structure.

The computer or the embedded system in the present embodiment is aimed at executing the individual processes of the present embodiment according to the program product stored in the recording medium, and may be an apparatus solely composed of a personal computer or a microcomputer; or may be a system in which a plurality of devices are connected via the network.

In addition, the computer in the present embodiment includes not only personal computer, but also includes, for example, arithmetic processing unit contained in information processing device, or microcomputer, thus collectively referring to instruments and devices capable of implementing the functions of the present embodiment with use of the program product.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus comprising:
a storage storing (i) a neural network model for classifying an image and (ii) training data, the training data comprising image data of a plurality of images, and each of the plurality of images being associated with a ground truth; and
a hardware processor operably coupled to the storage, the hardware processor being configured to:
perform, on the neural network model, an adaptation processing that includes at least either insertion of an activation function, or correction of the activation function;
generate a trained model for classification by training the neural network model on which the adaptation processing has been performed using the training data stored in the storage as input; and
perform pruning on the trained model to generate a reconstructed model from which a parameter has been reduced,
wherein the reconstructed model is iteratively processed by the adaptation processing, the training, and the pruning, until a predetermined determination index is equal to or smaller than a threshold value, whereby pruning of the trained model is completed, and
wherein, in response to completion of pruning of the trained mode, the hardware processor stores the reconstructed model in the storage.

2. The apparatus according to claim 1, wherein the processor performs the insertion of the activation function by connecting the activation function next to a hidden layer to be pruned, from among a plurality of hidden layers that constitute the neural network model.

3. The apparatus according to claim 1, wherein the processor performs the correction of the activation function, by replacing a first activation function contained in the neural network model, with a second activation function which is different from the first activation function.

4. The apparatus according to claim 3, wherein the second activation function has a smaller gradient of a parameter relative to loss calculated during training of a model, as compared with the first activation function.

5. The apparatus according to claim 1, wherein the processor performs the correction of the activation function, by connecting a first activation function contained in the neural network model, to a point different from a current point of connection.

6. The apparatus according to claim 1, wherein the processor restores the activation function inserted or corrected by the adaptation processing, to a state before the adaptation processing.

7. The apparatus according to claim 1, wherein the processor is further configured to:

determine whether performance of the reconstructed model after the adaptation processing is equivalent or superior to performance of the model before the adaptation processing; and maintain the adaptation processing for the reconstructed model, if the performance of the reconstructed model after the adaptation processing is equivalent or superior to the performance of the model before the adaptation processing.

8. A learning method executed under control of a hardware processor operably coupled to a storage, the storage storing (i) a neural network model for classifying an image and (ii) training data, the training data comprising image data of a plurality of images, each of the plurality of images being associated with a ground truth, and the method comprising:

performing, on the neural network model, an adaptation processing that includes at least either insertion of an activation function, or correction of the activation function;

generating a trained model for classification by training the neural network model on which the adaptation processing has been performed using the training data stored in the storage as input; and performing pruning on the trained model to generate a reconstructed model from which a parameter has been reduced, wherein the reconstructed model is iteratively processed by the adaptation processing, the training, and the pruning, until a predetermined determination index is equal to or smaller than a threshold value, whereby pruning of the trained model is completed, and wherein the method further comprises, in response to completion of pruning of the trained mode, storing the reconstructed model in the storage.

9. The method according to claim 8, wherein the performing the adaptation process performs the insertion of the activation function by connecting the activation function next to a hidden layer to be pruned, from among a plurality of hidden layers that constitute the neural network model.

10. The method according to claim 8, wherein the performing the adaptation process performs the correction of the activation function, by replacing a first activation function contained in the neural network model, with a second activation function which is different from the first activation function.

11. The method according to claim 10, wherein the second activation function has a smaller gradient of a parameter relative to loss calculated during training of a model, as compared with the first activation function.

12. The method according to claim 8, wherein the performing the adaptation process performs the correction of the activation function, by connecting a first activation function contained in the neural network model, to a point different from a current point of connection.

13. The method according to claim 8, wherein the performing the adaptation process restores the activation function inserted or corrected by the adaptation processing, to a state before the adaptation processing.

14. The method according to claim 1, further comprising:

determining whether performance of the reconstructed model after the adaptation processing is equivalent or superior to performance of the model before the adaptation processing; and maintaining the adaptation processing for the reconstructed model, if the performance of the reconstructed model after the adaptation processing is equivalent or superior to the performance of the model before the adaptation processing.

* * * * *